(12) United States Patent
Freepons

(10) Patent No.: US 11,864,486 B2
(45) Date of Patent: Jan. 9, 2024

(54) AUTOMATED PLANTER APPARATUS

(71) Applicant: SQUARE ROOTED, LLC, Prosser, WA (US)

(72) Inventor: Thomas A. Freepons, Prosser, WA (US)

(73) Assignee: SQUARE ROOTED, LLC, Prosser, WA (US)

( * ) Notice: Subject to any disclaimer, the term of this patent is extended or adjusted under 35 U.S.C. 154(b) by 672 days.

(21) Appl. No.: 17/030,142

(22) Filed: Sep. 23, 2020

(65) Prior Publication Data

US 2022/0087096 A1    Mar. 24, 2022

(51) Int. Cl.
| | | |
|---|---|---|
| *A01C 11/00* | (2006.01) | |
| *A01C 5/06* | (2006.01) | |
| *A01B 63/00* | (2006.01) | |

(52) U.S. Cl.
CPC ............ *A01C 11/00* (2013.01); *A01B 63/008* (2013.01); *A01C 5/062* (2013.01); *A01C 5/066* (2013.01)

(58) Field of Classification Search
CPC ......... A01C 11/00; A01C 11/02; A01C 11/04; A01C 5/062; A01C 5/066; A01B 63/008
See application file for complete search history.

(56) References Cited

U.S. PATENT DOCUMENTS

| | | | | |
|---|---|---|---|---|
| 3,094,082 A | * | 6/1963 | Wilson .................... | A01C 11/02 111/111 |
| 3,643,611 A | * | 2/1972 | Owens .................... | A01C 11/02 172/166 |
| 4,116,137 A | * | 9/1978 | Westerhoven ......... | A01C 11/02 111/115 |
| 4,341,333 A | * | 7/1982 | Boa ......................... | A01C 11/02 225/101 |
| 4,436,039 A | * | 3/1984 | Stephens, Jr. .......... | A01C 11/02 280/206 |
| 4,597,343 A | * | 7/1986 | Nambu ................... | A01C 11/02 111/105 |
| 4,829,915 A | * | 5/1989 | Ahm ....................... | A01C 7/048 405/176 |
| 4,970,972 A | * | 11/1990 | Williams ............. | A01C 11/025 111/111 |
| 5,121,701 A | * | 6/1992 | Reed ....................... | A01C 11/02 111/105 |
| 5,265,546 A | * | 11/1993 | Sheeter ................... | A01C 11/02 111/101 |

(Continued)

*Primary Examiner* — Jamie L McGowan
(74) *Attorney, Agent, or Firm* — Svendsen Legal, LLC

(57) ABSTRACT

An automated planter apparatus for inserting a rootstock, rooting stock or plantings into the ground, especially useful in hop yards, vineyards and orchards, the planter apparatus mountable to a tractor or trailer, and with grapes as a preferred rooting stock. Apples, or any other type of grafted tree or vine may be planted in the alternative. The planter apparatus includes a chain driven grabber mechanism, attached to a chain loop and driven by sprockets at each end, the grabber mechanism able to grasp and insert the rooting stock into the soil at precisely predetermined points, preferably aided by GPS (Global Positioning System). The grabber mechanism includes a pair of grabbers that receive the rooting stock at a pick-up, and then rotate from an open position to a closed position as the chain loop proceeds around a forward sprocket, rotating the grabber mechanism to a planting release.

20 Claims, 8 Drawing Sheets

(56) References Cited

U.S. PATENT DOCUMENTS

| | | | | |
|---|---|---|---|---|
| 5,996,513 | A * | 12/1999 | Nanbu | A01C 11/02 |
| | | | | 111/105 |
| 6,305,303 | B1 * | 10/2001 | Wright | A01C 7/048 |
| | | | | 111/114 |
| 2002/0010561 | A1 * | 1/2002 | Kaji | A01C 11/02 |
| | | | | 702/155 |
| 2006/0260522 | A1 * | 11/2006 | Fountain | A01G 9/086 |
| | | | | 111/105 |
| 2015/0150188 | A1 * | 6/2015 | Stroot | A01C 11/02 |
| | | | | 111/105 |
| 2015/0342112 | A1 * | 12/2015 | Buell | A01C 11/02 |
| | | | | 111/105 |
| 2020/0305339 | A1 * | 10/2020 | Parrein | A01B 79/005 |
| 2021/0298228 | A1 * | 9/2021 | Unruh | A01C 11/04 |
| 2022/0087096 | A1 * | 3/2022 | Freepons | A01C 5/066 |

* cited by examiner

AUTOMATED PLANTER APPARATUS

TECHNICAL FIELD

An automated planter apparatus for inserting a rootstock or plantings into the ground, that is especially useful in hop yards, vineyards and orchards, with the planter apparatus mountable to at tractor or trailer. More specifically, a planter apparatus that includes a chain driven grabber mechanism attached to a chain loop and driven by sprockets at each end of the chain loop, the grabber mechanism able to grasp and insert a rootstock into the soil as precise and predetermined points, preferably aided by GPS (the Global Positioning System).

BACKGROUND OF THE INVENTION

The use of mechanized systems at farms, fields, vineyards, orchards, and hop yards is dramatically increasing in response to the problems and pressures related to rising labor costs, coupled with the unavailability of skilled workers. To remain viable, the agricultural industry must develop solutions that utilize technological improvements to reduce the labor required to accomplish needed tasks safely and economically. Any new mechanism or apparatus that serves well in aiding the preparation planting and harvesting of crops and plantings and reduces the number of workers required to perform required operations is desirable. The following is a disclosure of preferred embodiments of a planter apparatus especially useful for inserting a rootstock or plantings into the ground. The present invention will be understood by reference to the following detailed description taken in conjunction with the accompanying drawings.

Figure 1:
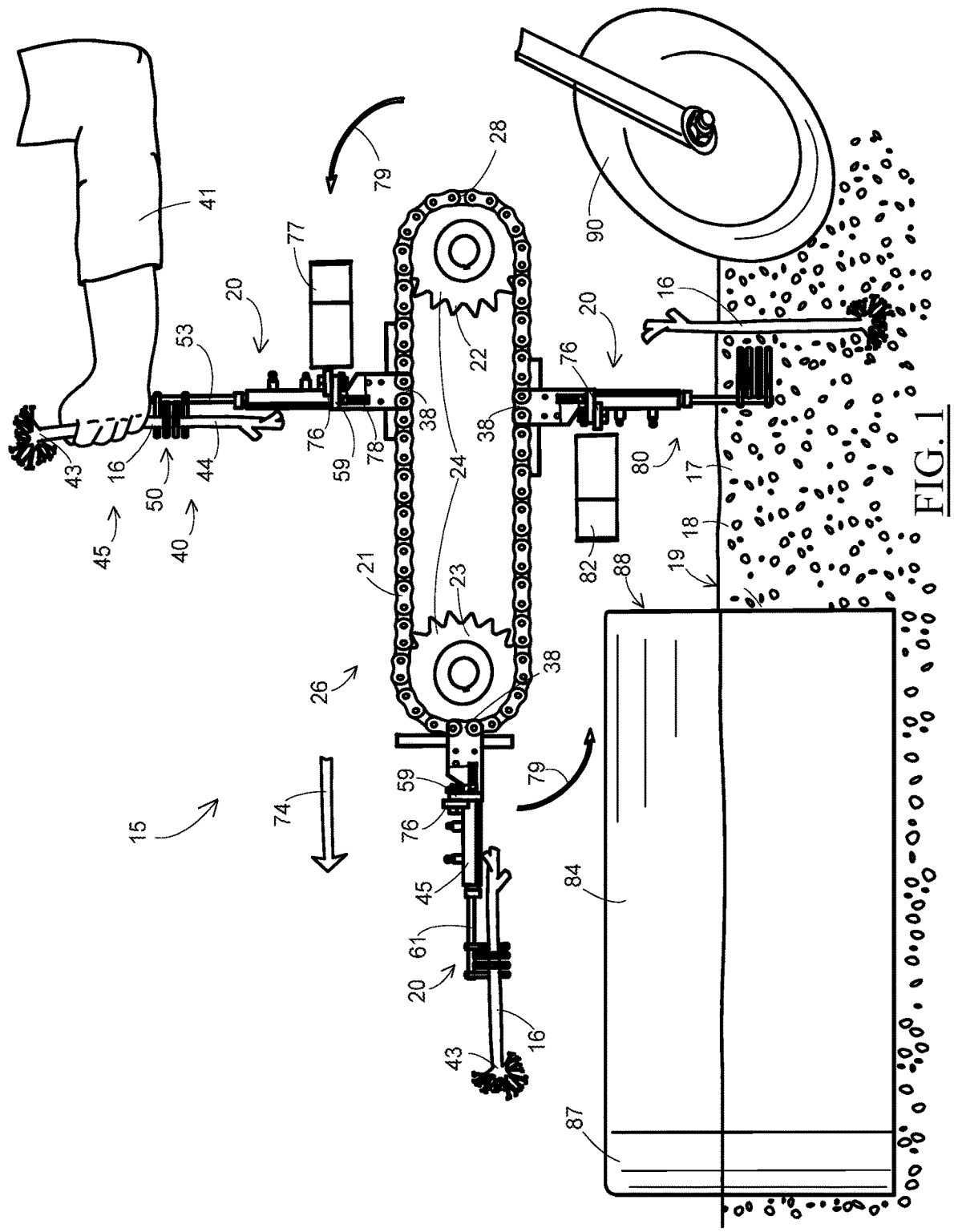
FIG. 1 is a side view of a portion of an automated planter apparatus, according to an embodiment of the invention.

Reference characters included in the above drawings indicate corresponding parts throughout the several views, as discussed herein. The description herein illustrates one preferred embodiment of the invention, in one form, and the description herein is not to be construed as limiting the scope of the invention in any manner. It should be understood that the above listed figures are not necessarily to scale and may include fragmentary views, graphic symbols, diagrammatic or schematic representations, and phantom lines. Details that are not necessary for an understanding of the present invention by one skilled in the technology of the invention, or render other details difficult to perceive, may have been omitted.

DETAILED DESCRIPTION OF SPECIFIC EMBODIMENTS

The present invention provides an automated planter apparatus. FIGS. 1 through 8 show a preferred embodiment of the automated planter apparatus, which may be more simply referred to herein as the "planter apparatus" 15, as employed to insert a rooting stock 16 into a field 17 or cultivated area, or more broadly the "field" may be any soil material 18 or growth medium. Conventionally, "rooting stock" is broadly defined as a viable plant material from which new growth can be produced. Also, the term "rooting stock" or alternatively "rootstock" may refer to a plant, or a stem with a developed root system, to which a bud or fruit producing wood from another plant is grafted. Additionally, the term "rooting stock" may refer to a rhizome or any underground stem. Therefore, for the present specification and appended claims, the rooting stock is broadly defined to incorporate the above definitions, and broadly to any plant material that after insertion into the soil material, can grow and mature.

Additionally, the "field" 17 can include any cultivated area, alternatively described as a farm, field, forest, plantation, orchard, crop land, vineyard, hop yard, or any such area conventionally known by those skilled in agriculture, and used for growing or cultivating an agricultural crop or commodity for any need or purpose, including erosion control, commercial or industrial production, or for ornamental appearance. The planter apparatus 15 can be pushed or towed as a trailer along a soil surface 19, of the soil material 18 that received the rooting stock 16, or the planter apparatus can travel under its own power in the alternative.

Figure 2:
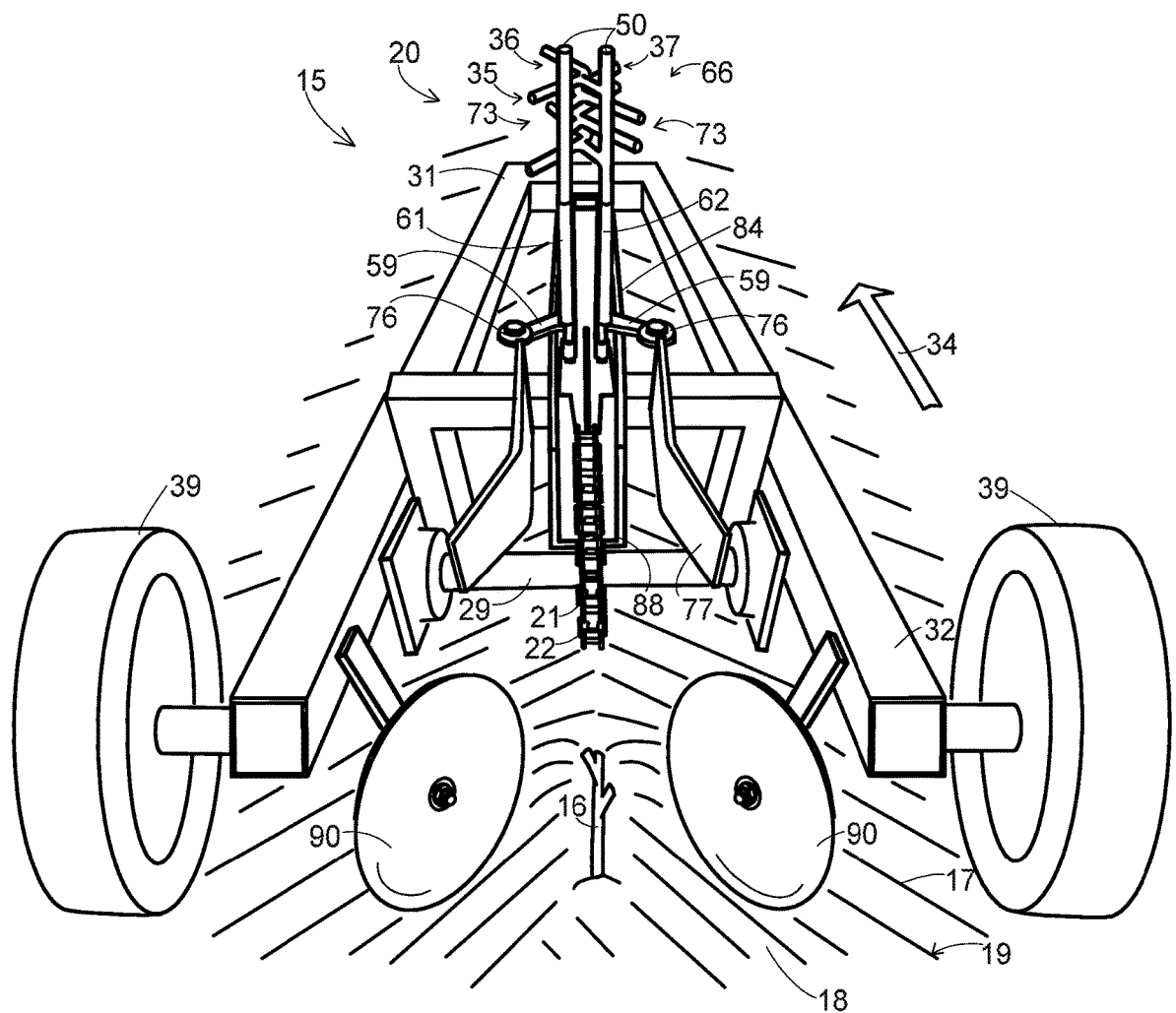
FIG. 2 is a rear perspective view of a portion of the automated planter apparatus, according to an embodiment of the invention.

A preferred embodiment planter apparatus 15 is shown in FIG. 1 and includes a grabber mechanism 20 mounted on a chain 21. The chain wraps around a rear sprocket 22 and a forward sprocket 23. The rear sprocket and a forward sprocket may be referred to herein as a pair of primary sprockets 24. Most preferably, a top sprocket 25 is also included in the planter apparatus and functioning as either an idler, to reduce slack or increase tension in the chain, or to drive the chain. The rear sprocket, the forward sprocket, and any optional additional sprockets, including the top sprocket may be referred to as a sprocket system 26. Each sprocket of the sprocket system is mounted on a planter frame 27 as shown in FIG. 2, with the chain wrapping around the pair of primary sprockets forming a continuous chain loop 28, and a drive line 29 mechanically or hydraulically linked (as preferred) to the rear drive sprocket. The planter frame has a forward frame end 31 and a rearward frame end 32, with a frame wheel pair 33 located proximate to the rearward frame end. Preferably, the forward sprocket is located proximate to the forward frame end of the planter frame and the rearward sprocket is located proximate to the rearward frame end of the planter frame, as shown in FIG. 1. The planter frame moves in a forward travel direction 34, preferably pulled or self-powered, most preferably with the forward sprocket receiving the drive line.

Most preferably, the rear sprocket 22 and the forward sprocket 23 each have the same diameter and total teeth count, to simplify calibrating the speed and planting rate of the planter apparatus 15. Additionally, a third sprocket can be included as an idler sprocket (not shown), to adjust tension in the continuous chain loop 28, as is well known to those skilled in chain drive design and selection.

Figure 3:
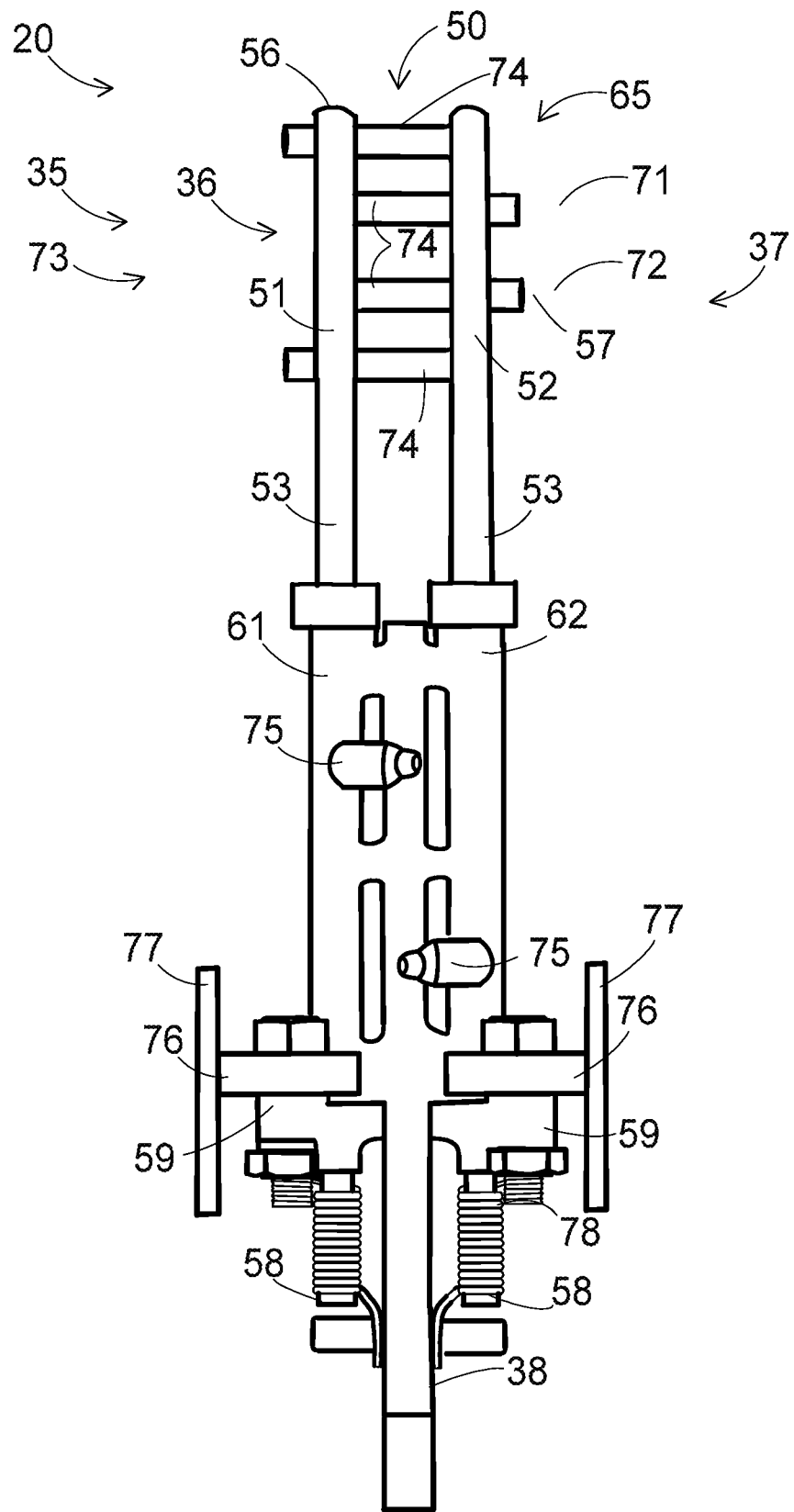
FIG. 3 is an end-on view of a grabber mechanism of the automated planter apparatus, with the grabber mechanism in the closed grab position, according to an embodiment of the invention.
Figure 4:
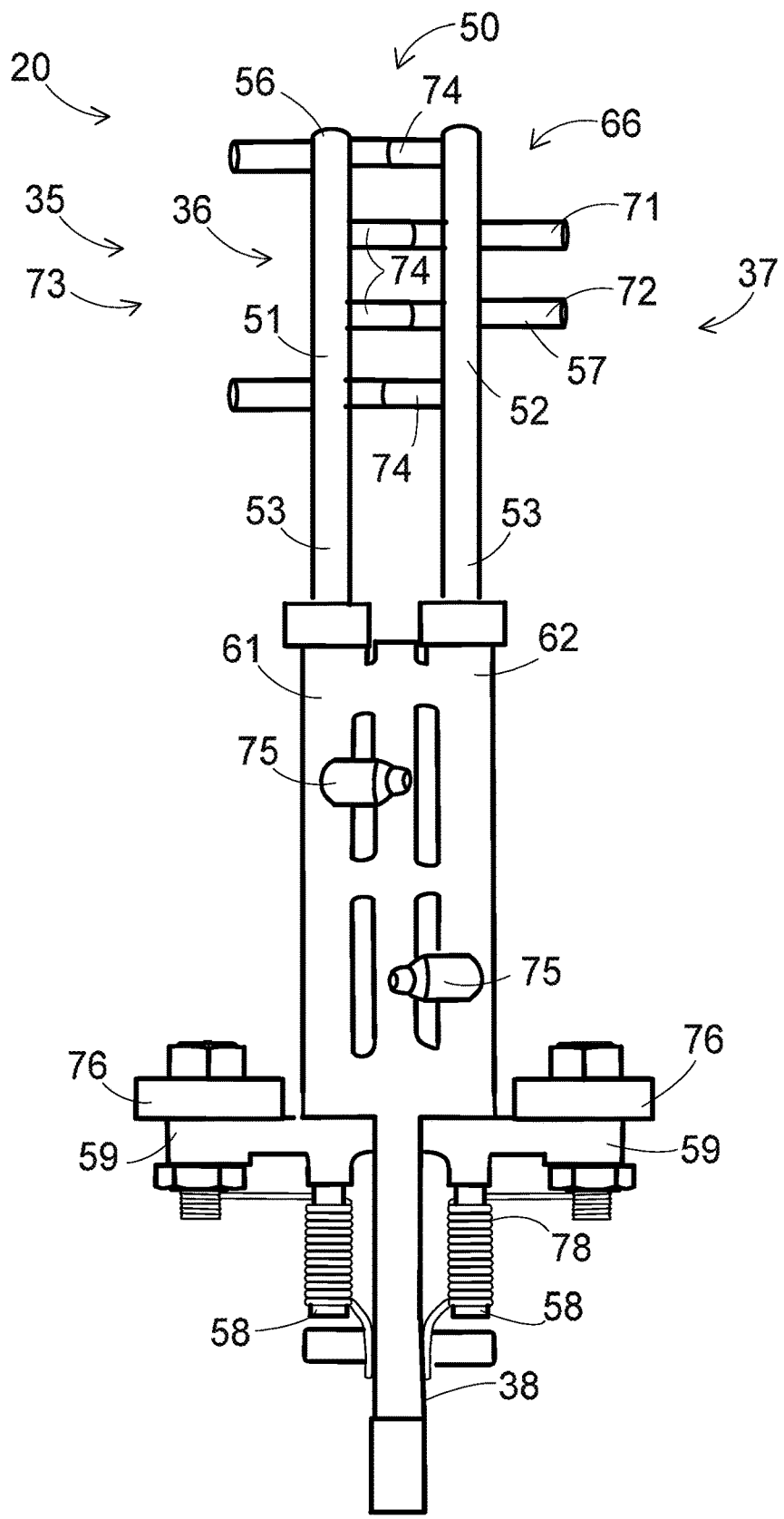
FIG. 4 is an end-on view of a grabber mechanism of the automated planter apparatus, with the grabber mechanism in the open grab position, according to an embodiment of the invention.

Preferably for the planter apparatus 15, the grabber mechanism 19 is a pair of grabbers 35, with a first grabber 36 coupled with a second grabber 37 as shown in FIGS. 3 and 4. The first grabber and the second grabber, positioned alongside one another, each attaches to the chain 20 of the continuous chain loop 28. Preferably, the planter apparatus includes three or optionally four grabber mechanisms, with each grabber mechanism mounted to the chain with a grabber connection 38, as shown in FIG. 1, which is most preferably a bolted attachment, but alternatively could be a welded, riveted, or any other connection type known to those skilled in mechanical attachments.

It is conceived that in alternative embodiments of the planter apparatus 15, any number of the grabber mechanism 20 could be attached to the chain 21, simply requiring a longer continuous chain loop 28 and the pair of primary sprockets 24 more widely spaced apart. A most preferred embodiment of the planter apparatus includes three grabber mechanisms, as shown in FIG. 1.

As detailed in FIG. 1, each grabber mechanism 20 receives the rooting stock 16 at a pick-up station 40 on the planter apparatus 15. Preferably, this is a manual placement of the rooting stock into the grabber mechanism by an operator 41. With the rooting stock having a root end 43 and a sprout length 44, the rooting stock is placed into the grabber mechanism in an inverted orientation 45, with the root end above the sprout end, relative to the soil surface 19. Alternative rooting stock configurations can include a cup, bag, or pot, placed over the rot end and is preferably water dissolvable or degrade-able after insertion into the soil material.

As shown in FIGS. 3 through 6, in a preferred embodiment of the planter apparatus 15, each of the pair of grabbers 35 in the grabber mechanism 20 includes a grab rod pair 50, comprising a first grab rod 51 and a second grab rod 52. Alternatively, and as shown in FIGS. 3 and 4, the first grab rod and the second grab rod may be referred to singularly as a grab rod 53, or together as the grab rod pair. The first grab rod and the second grab rod of the grab rod pair each terminate at a grabber end 56 located proximate to a grab tine 57. Opposite to the grabber end, each grab rod terminates at a base end 58 located proximate to a cam leg 59.

Figure 5:
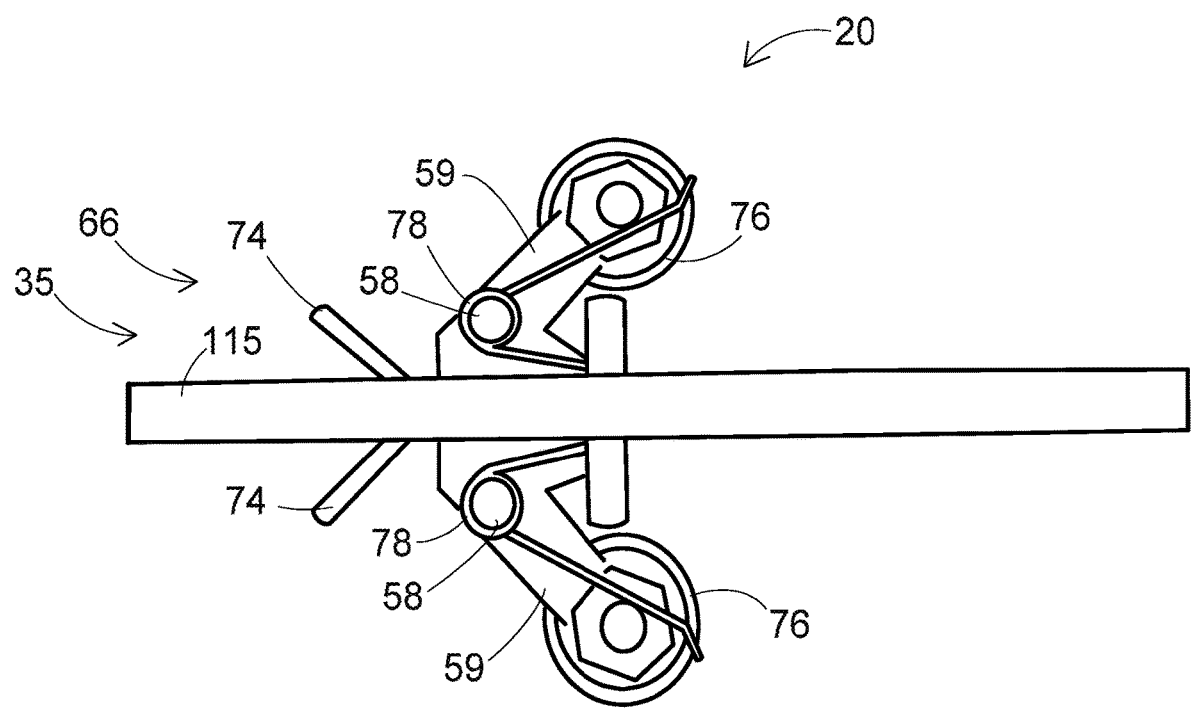
FIG. 5 is a top view of a grabber mechanism of the automated planter apparatus, with the grabber mechanism in the closed grab position, according to an embodiment of the invention.
Figure 6:
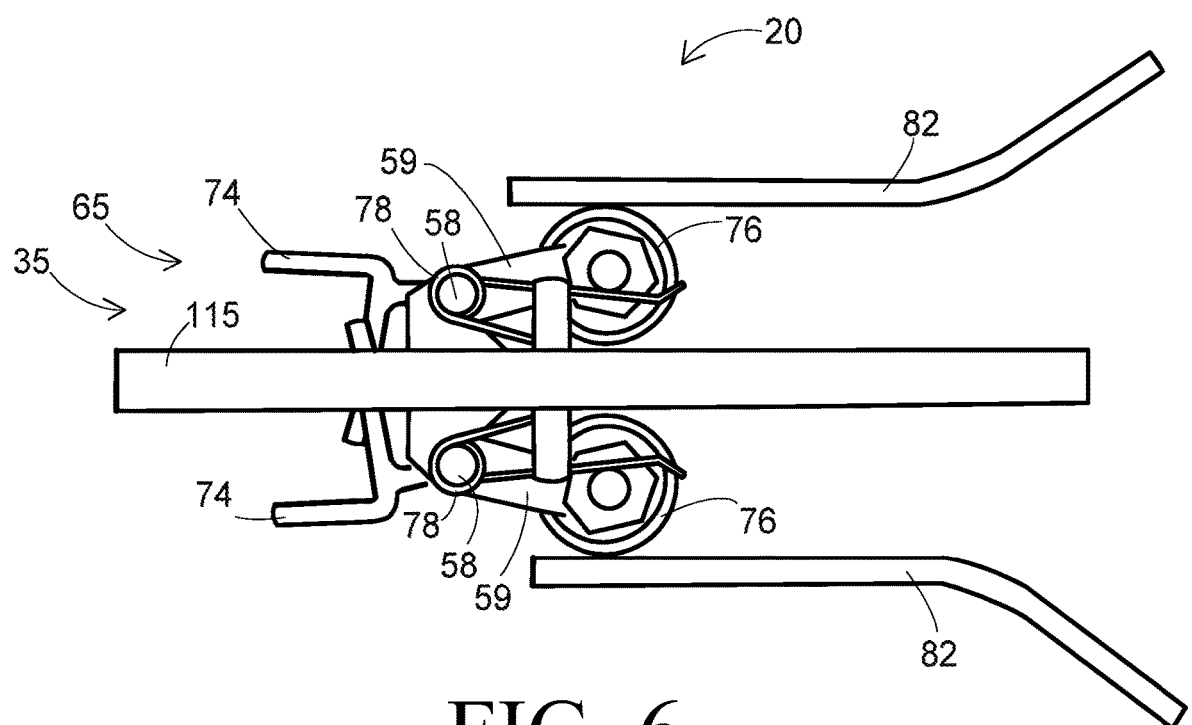
FIG. 6 is a top view of a grabber mechanism of the automated planter apparatus, with the grabber mechanism in the open grab position, according to an embodiment of the invention.

The first grab rod 51 is received into a first sleeve bearing 61, and the second grab rod 52 is received into a second sleeve bearing 62, as shown in FIGS. 3 and 4. The first sleeve bearing and the second sleeve bearing are located approximately between the grab tine 57 and the cam leg 59 on each the first grab rod and the second grab rod, respectively. The first sleeve bearing and the second sleeve bearing are oriented parallel to each other, and operate together to grasp the rooting stock 16, as shown in FIG. 1. The grab rod pair rotates to grasp the rooting stock, with the first grab rod 51 rotating in the first sleeve bearing 61 and the second grab rod rotating within the second sleeve bearing. The grab rod pair rotates from an open grab position 65 as shown in FIGS. 1, 4 and 6, to a closed grab position 66, as shown in FIGS. 1, 3 and 5, and are able to rotate back and forth from the open grab position to the closed grab position, repeatedly.

The grab tine 57 of each grab rod 53 is detailed in FIGS. 3 and 4, with the first grab rod 51 having a first grab tine 71 and the second grab rod having a second grab tine 72. Preferably, the first grab tine and the second grab tine are each a multiple of tines 73, with each tine most preferably formed of a short length of approximately four inches, and a small diameter of approximately ¼ inch for each tine's rod or bar, which can be referred to as a tine bar 73. Preferably, each tine bar is bent at approximately a right angle (90 degrees) and attached proximate to the grabber end of each grab rod 53, and most preferably attached to the grab rod with a welded connection so that each of the multiple of tines approximately two inches in length, extending from the grab rod. As shown in FIGS. 3 and 4, the tine bar most preferably is extended from the grab rod with a tine arm 74, which is preferably welded to the grab rod 53 and welded to the tine bar.

The rotational movement or actuation of the grabber mechanism 20 for the planter apparatus 15 includes the movement of the grab rod pair 50 from the closed grab position 66 to the open grab position 65. As shown in FIGS. 1 through 6, this rotational movement is accomplished by the action of the cam leg 59 located proximate to the base end 58 of each grab rod 53. The cam leg extends from the grab rod and most preferably terminates with a roller cam 76. From the normally closed grab position, the grab rod pair is rotated to the open grab position by a top cam opener 77 engaging the roller cam. Preferably, the top cam opener is located as shown in FIGS. 1 and 2, as located proximate to the pick-up station 40. As a less preferred alternative to the roller cam, a smooth surface on the terminal end of the cam leg could be employed to contact the top cam opener and rotate the grab rod.

The top cam opener 77 is mounted to the planter frame 27, as shown in FIGS. 1 and 2, preferably by a bolted attachment but the top cam opener may be maybe welded to the planter frame or attached by any other typical attachment method in the alternative. Most preferably, the top cam opener is a steel plate that is adjustable forward or rearward relative to the chain, to the desired pick up station 40, where the rooting stock 16 is received into the grab rod pair 50 as the grabber mechanism 20 moves about the continuous chain loop 28. After the grabber mechanism travels past the top cam opener, the cam legs 59 of the grab rod pair disengage from the top cam opener and are forced to return to the closed grab position 66 by a grab rod torsion spring 78 that is mounted on each grab rod, as shown in FIGS. 3 through 6.

Loading each rooting stock 16 into the grabber mechanism 20 of the planter apparatus 15 is accomplished manually by the operator 41, preferably sitting above and behind the pick-up station 40, in a seated position with the legs of the operator straddling the chain 21. Each piece of rooting stock is loaded into the grabber mechanism, when the grabber mechanism is at the pick-up station. Preferably, the rooting stock is loaded as shown in FIG. 1, with the root end 43 upward, and held in this inverted position by the operator during a dwell interval 69. Each rooting stock must be held in this position until the dwell interval expires, of preferably between a tenth of a second and a full second, and most preferably one half of a second. After the dwell interval, the chain resumes rotation and the grabber mechanism proceeds in returning returned to the closed grab position 66, securing the rooting stock within the grabber mechanism.

After each grabber mechanism 20 receives the rooting stock 16 in turn, at the pick-up station 40 on the continuous chain loop 28 as discussed above, the chain 21 as most preferably driven by the rear sprocket 22, rotates the grabber mechanism holding the rooting stock in a forward chain movement direction 79. The chain proceeds in the forward chain movement direction around the forward sprocket, rotating the grabber mechanism to a planting release station 80. The planting release position is opposed approximately 180 degrees relative to the pick up station 40, as shown in FIG. 1. In the preferred embodiment of the planter apparatus 15, at both the planting release station and the pick up station the grabber mechanism holds the rooting stock 16 vertically, relative to the soil surface 19.

The rooting stock 16 is released by the grabber mechanism 20 at the planting release station 80 in the same series of operational steps as when the grabber mechanism initially was received the rooting stock at the pick-up station 40, with the grab rod pair 50 of the pair of grabbers 35 rotating from the closed grab position 66 holding the rooting stock, to the open grab position 65, releasing the rooting stock. Again, as shown in FIG. 6, this rotational movement of the grab rod pair is accomplished by the action of the roller cam 76 on the cam leg 59 located proximate to the base end 58 of each grab rod 53. From the normally closed grab position, the grab rod pair rotates to the open grab position by a bottom cam opener 82, which is located proximate to the planting release station to engage the roller cam.

Similar to the top cam opener 77, the bottom cam opener 82 of the planter apparatus 15 is mounted to the planter frame 27, as shown in FIG. 2, preferably by a bolted attachment but the cam opener may be maybe welded to the planter frame or attached by any other typical attachment method in the alternative. Most preferably, the bottom cam opener is a steel plate that is adjustable forward or rearward relative to the chain, to the planting release station, which is a desired release location for the rooting stock from the grab rod pair 50 as the grabber mechanism 20 moves about the continuous chain loop 28.

After the grabber mechanism 20 travels past the bottom cam opener 82, the cam legs 59 of the grab rod pair disengage from the bottom cam opener and are forced to return to the closed grab position 66 by the grab rod torsion spring 78 that is mounted on each grab rod 53, as shown in FIGS. 3 though 6, and serves to push and maintain the grab rod pair to the closed grab position with the grab tines 57 nested together, as shown in FIGS. 3 and 5.

Planting depth is maintained by the planter frame 27, which rides at a preset and adjustable height relative to the soil surface 19 of tail end wheels 39 located proximate the rearward frame end 32. Preferably, the planter frame also pivots at a forward attachment point near a ripper shank 84. The ripper shank includes a plow blade 87 located at its forward end and a throat 88 located at its rearward end as shown in FIGS. 1 and 2, which receives the rotating grabber mechanisms 20 with the rooting stock 16. The pivoting ripper shank allows for the planter frame, which carries the continuous chain loop 28, to follow the soil surface and maintain a uniform depth for all rooting stock, regardless of changing depth of the trench created by the ripper shank. Depth of the planter frame is controlled by the 3-point position of the planter frame's ripper shank and the tail end wheels, behind a conventional towing tractor. Preferably, the planter apparatus 15 of the present invention is included in a tow-behind trailer including the planter frame towed by a conventional tractor, but alternatively the planter frame could be included as a part of any typical farm vehicle, tractor, or trailer, or in a custom fitted self-propelled platform, or any other form of farm, orchard, vineyard or hop yard transportation, as known to those skilled in the design of agricultural vehicles.

Covering of the rooting stock 16 after release from the grabber mechanism 20 at the planting release station 80 is accomplished preferably by a pair of tiller discs 90 mounted on each side of the planter frame 27 just to the rearward frame end and behind the grabber mechanism at the planting release station, as shown in FIG. 1. Preferably, the pair of tiller discs are height adjustable, conventional tiller disks, to move the soil material 18 over the root end 43 of the rooting stock a moment before the grabber mechanism is actuated by the action of the cam legs 59 on the bottom cam opener 82 to the open grab position, and the multiple of tines 73 release the rooting stock. This covering over of the root end of the rooting stock by the tiller disks with the soil material ensures a substantially vertical and accurate placement of the rooting stock. In an additional alternative embodiment, two-sets of the tiller disc pairs can be employed. In this alternative, the two pairs of tiller discs are mounted in an echelon pattern to move the soil material over the rooting stock.

In additional alternative configuration, conventional packer wheels (not shown) could be used to run behind the planter frame 27 to compress soil material around the plant and water applied to improve settling and prevent the rooting stock from drying out. Also, additional persons or machinery, as well known to tamp and smooth soil after planting operations, may follow behind the planter apparatus 15 to additionally pack the rooting stock, if necessary.

Figure 7:
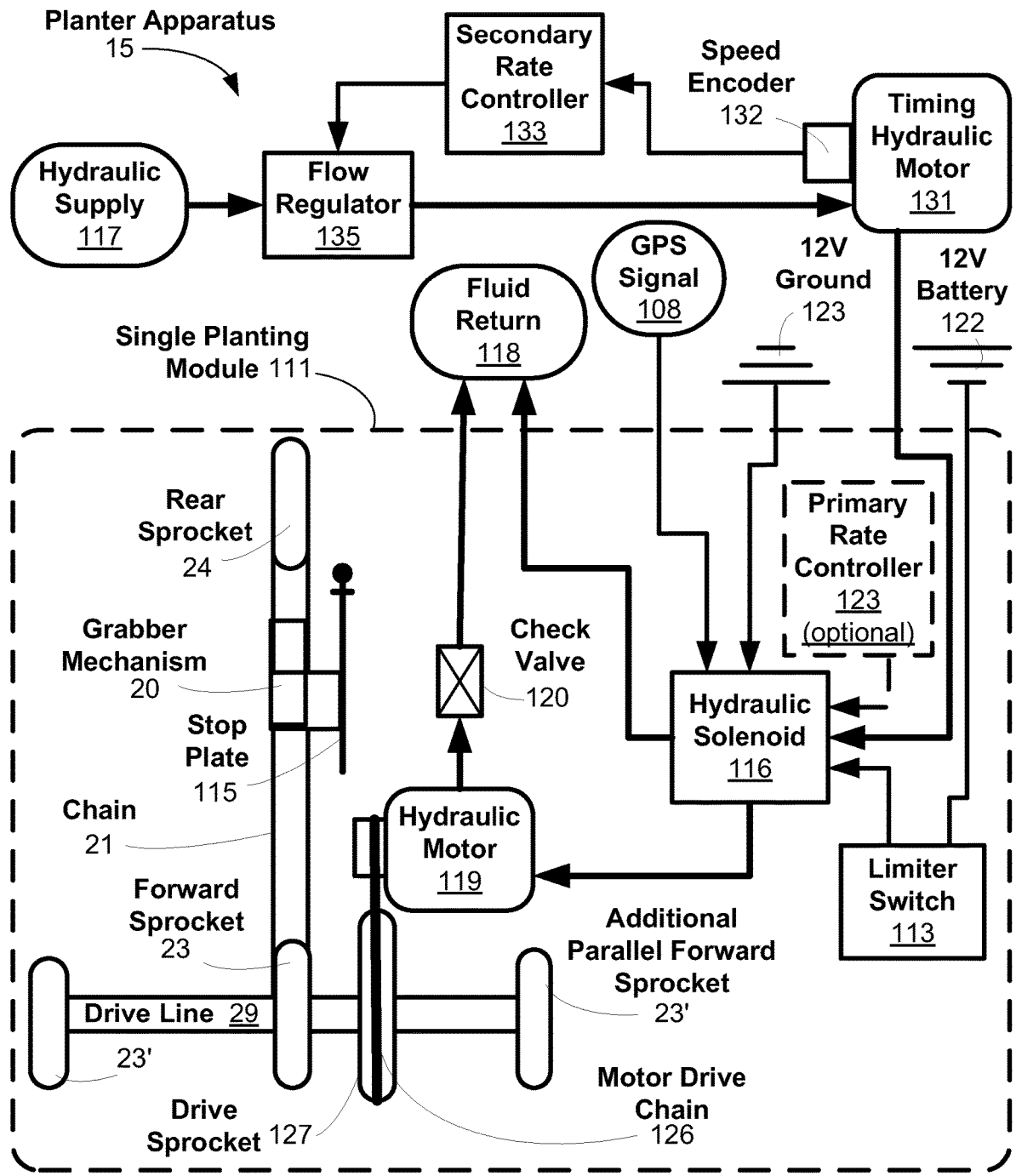
FIG. 7 is a schematic view of a portion of the automated planter apparatus, according to an embodiment of the invention.
Figure 8:
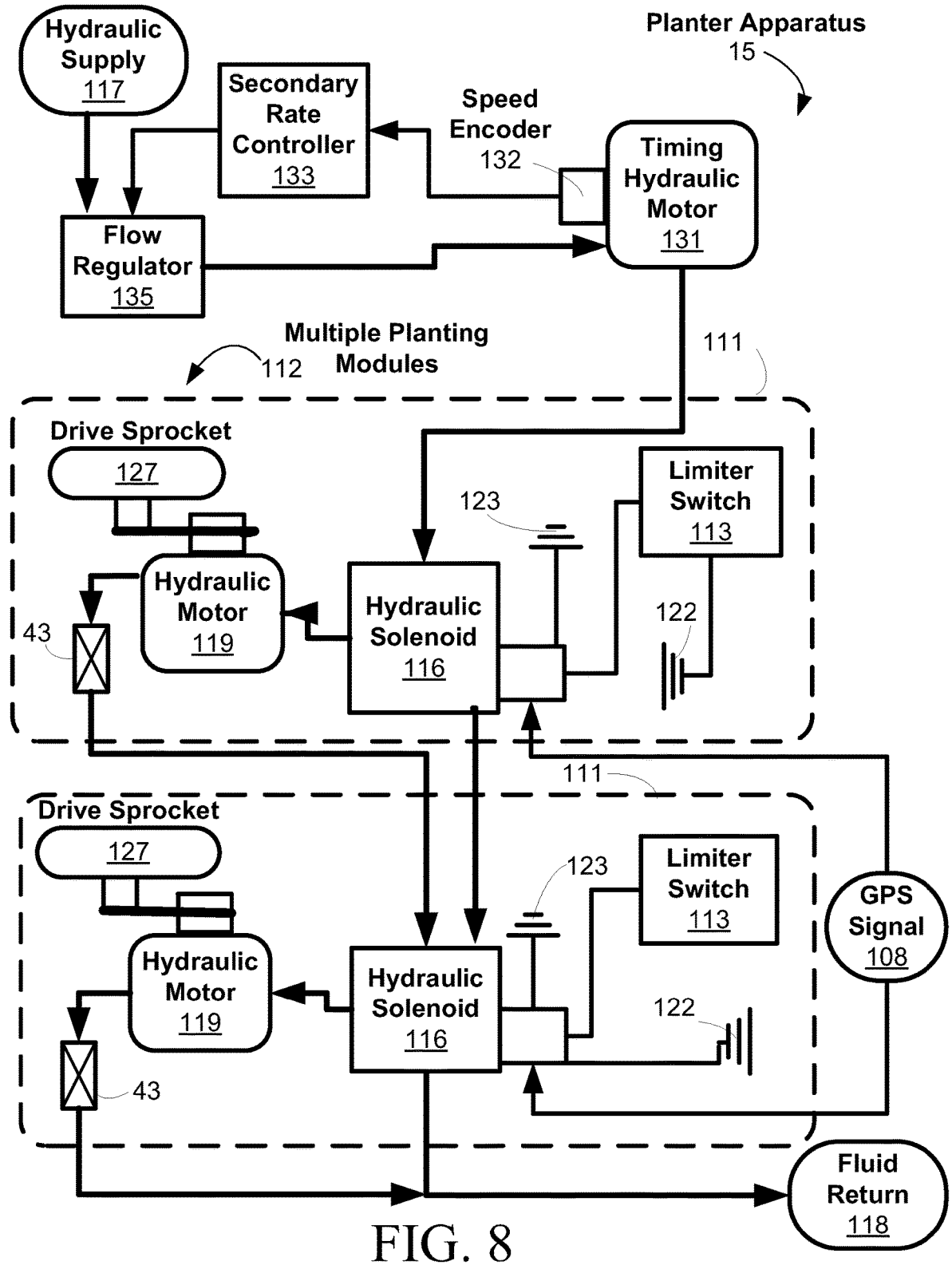
FIG. 8 is a schematic view of a portion of the automated planter apparatus, according to an embodiment of the invention.

The planter frame 27 with the planter apparatus 15, is shown schematically in FIGS. 7 and 8. Preferably, the drive line 29 also powers one or more additional parallel forward sprockets 23' that mount to the planter frame, with the planter frame moving in the forward travel direction 34 toward the forward frame end 32, as previously discussed.

The automated planter apparatus 15 of the present invention serves well to ease the planting into the ground at a predetermined planting location 100 into the soil surface 19, especially as a part of the system of the planter apparatus. With the use of an indexing stop-motion 106, a spacing plant-to-plant spacing 107 can be set and adjusted by the use of a GPS signal 108 in an indexing program 109. "GPS" refers to the well known Global Positioning System, in which the latest stage of "RTK" or real-time kinematic accuracy enhancement and preferably uses the "L5" satellite broadcast band, to pinpoint a terrestrial object to approximately within 1 to 2 centimeters (0.38 to 0.79 inches). Initially, a between-row width 110 is adjusted by a width input entered into the indexing program.

Alternative preferred embodiments of the planter apparatus 15 may be employed on "one row" applications (planting patterns using a single planter apparatus), and by positioning additional planter apparatus on the planter frame 27 to achieve "two rows" or more, in addition to GPS programing. For planter row spacings of less than 24 inches but greater than 18 inches, the use of four grabber mechanism 20 are most preferred, with approximately 15 inches of chain 21 between each grabber. For spacings greater than 24 inches, three grabber mechanisms are preferred, with approximately 20 inches between each grabber, however four regularly spaced grabbers may be used as an option.

Preferably, operation of the planter apparatus 15 is controlled by an electric-over-hydraulic powered circuit system 90, the standard components of and typical operation thereof are well known to those skilled in design of such systems. A schematic of a preferred electric-over-hydraulic powered circuit system for a single planting module 111 of the planter apparatus is illustrated in FIG. 7 and shows unique features of the electric-over-hydraulic powered circuit system as utilized in the planter apparatus of the present invention. Most preferably, a limiter switch 113 is mounted to the planter frame 27, with the limiter switch adjustable forward or rearward on the planter frame relative to the chain 21, to adjust a stop position 94. The stop position is the point at which a stop-plate 115 contacts the limiter switch to momentarily halt movement of the continuous chain loop 28 as the chain proceeds in the forward chain movement direction 79.

Most preferably, the stop-plate 115 is mounted proximate to the chain 21 at each grabber mechanism 20, alongside the base end 58 of each grab rod pair 50 and near the chain. The stop-plate is preferably bolted to the grabber mechanism, but the stop-plate may be may be welded or attached by any other typical attachment method in the alternative. As shown in FIG. 7, the planter apparatus uses a 12V battery 122 across a 12V ground 123, to form a 12-volt DC control circuit. Alternatively, any conventional control voltage or control medium could be utilized for use in the planter apparatus 15, including pneumatic, direct digital, or mechanical linkages. The stop-plate serves to actuate and open the limiter switch, which is normally closed, thereby sending a control impulse to a motor switch 125, which is most preferably a solenoid operated diverter valve, which is a type of controller that is well known to those skilled in hydraulic controls. The motor switch employs the 12V DC supply voltage to open a hydraulic solenoid 116, which is a valve that routes flow of the hydraulic fluid to a hydraulic motor 119, which rotationally drives movement of a motor drive chain 126 that rotates a drive sprocket 127. The drive sprocket rotates the drive line 29 that rotates the forward sprocket 23. When the hydraulic solenoid is de-energized, the hydraulic fluid is bypassed by the hydraulic motor to a fluid return 118.

The speed of the chain 21 in the forward chain movement direction 79 is controlled by the speed of the hydraulic motor 119. In a simplified option as shown in FIG. 7, the speed of the hydraulic motor may be controlled by a primary rate controller 123, which derives speed information from the GPS signal 108. Most preferably, the primary rate controller is a Pulse Width Modulation (PWM) controller, which is a type of controller that is well known to those skilled in hydraulic controls.

In a preferred embodiment of the planter apparatus 15, the system of the planter apparatus 15 can include a timing hydraulic motor 131, which spins constantly and sends information by an speed encoder 132 to a secondary rate controller 133. Generally, a speed encoder is a well known electro-mechanical device employed by those skilled in the engineering and design of motor controls to provides an electrical signal used for detecting and maintaining a desired motor speed, or operational rate. Hydraulic flow is regulated by the secondary rate controller to match the speed of the chain 21 to the speed of the planter apparatus on the soil surface 19, without the "dwell time" due to the halting of the chain in the rotational cycle of the chain, by control input from the limiter switch 113. This ground speed matching of the rate controller maintains accurate placement of each of the rooting stock 16, and helps minimize damage to the rooting stock. Alternatively, the limiter switch could be indexed to the rotation of the rear sprocket 22 or the rear sprocket 23, with a bump or extension knob included on the indexed sprocket triggering the halt of the chain movement.

Most preferably, the hydraulic system of the planter apparatus 15 is a "pass through circuit." On three row machines, each row has a limiter switch, hydraulic valve and motor to allow for plantings where the 'X-axis' and 'Y-axis' are not perpendicular. This allows rows to cycle independently of each other while maintaining appropriate hydraulic flow to all row units. A simpler embodiment of the planter apparatus has only one hydraulic valve and motor that power all three rows by timing the pair of primary sprockets 24 and connected drive line 29. This simple system is only used where the x and y axis are substantially perpendicular.

FIG. 8 shows a multiple of planting modules 112 for the planter apparatus 15, with each of the multiple of planting modules substantially similar to the single planting module 111 shown in FIG. 7. A hydraulic supply 117 and a fluid return 118 are preferably used as a common source of motive power, to rotate each drive sprocket 127 through each hydraulic motor for each planting module, with a flow regulator 135 actuated by the secondary rate controller 133, to modulate the flow of pressurized hydraulic fluid to the timing hydraulic motor 131.

The planter apparatus 15 is primarily designed to plant grapes as a preferred rooting stock 16. However, the planter apparatus is also used to plant rooting stock for apples, or any other type of grafted tree in which a conventional "rootstock" may be planted first and later grafted over to the desired variety. It is expected that the planter apparatus could be used for bench grafted fruit varieties. "Bench grafting" is a technique primarily used for apples, where a piece of scion wood is grafted onto a rootstock to grow a new tree. Typically, the grafting is carried out in an indoor greenhouse or nursery environment in the late winter or early spring, using dormant scion wood from a tree of the variety to be propagated.

It is observed that the number of people required to operate the planter apparatus 15 may be reduced from six on a typical three row planting machine down to four. Ergonomically, the operator 41 occupies a sitting position, instead of lying or leaning over to place the rooting stock 16 into the soil material 18. Operators and laborers required to move and pack the rooting stock behind the machine is expected to be reduced by at least fifty percent when compared to conventional field planting techniques and mechanisms. Importantly, stress on laborers will be reduced as they are not required to watch for cross-lines and time the placement of each rooting stock. Additionally, the speed of planting is greatly increased by the planter apparatus of the present invention, as well as accuracy of placement of the rooting stock and depth control of the rooting stock plantings, especially when compared to conventional manual field planting techniques.

Additionally, it is well considered that instead of the preferred hydrostatic system, the planter apparatus 15 of the present invention could employ an electric servo or electric motor actuation system, or possibly a pneumatic actuated system in the alternative.

Of note, the terms "substantially," "proximate to" and "approximately" are employed herein throughout, including this detailed description and the attached claims, with the understanding that is denotes a level of exactitude or equivalence in amount or location commensurate with the skill and precision typical for the particular field of endeavor, as applicable.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited except by the following claims, as appropriately interpreted in accordance with the doctrine of equivalents.

The invention claimed is:

1. An automated planter apparatus, the planter apparatus comprising: a grabber mechanism mounted on a chain loop, the chain loop being a continuous loop, and the chain loop wrapped around a rear sprocket and warped around a forward sprocket; the rear sprocket and the forward sprocket mounted on a planter frame, the planter frame having a forward frame end and a rearward frame end; the grabber mechanism including a pair of grabbers, the pair of grabbers having a first grabber coupled with a second grabber, the first grabber and the second grabber positioned alongside each other and each attached to the chain loop; a rooting stock received by the grabber mechanism at a pick-up station, the rooting stock having a root end and a sprout length, and the rooting stock placed into the grabber mechanism in an inverted orientation, with the root end above the sprout end, relative to a soil surface beneath the planter frame; the first grabber having a first grab rod and the second grabber having a second grab rod, the first grab rod and the second grab rod comprising a grab rod pair; the first grab rod and the second grab rod of the grab rod pair each terminate at a grabber end, the grabber end located proximate to a grab tine, and each grab rod terminates at a base end, the grabber end located opposite to the base end, and the base end located proximate to a cam leg; the first grab rod received into a first sleeve bearing, and the second grab rod received into a second sleeve bearing, the first sleeve bearing located approximately between the grab tine and the cam leg, the first sleeve bearing located approximately between the grab tine and the cam leg on the first grab rod and the second sleeve bearing located approximately between the grab tine and the cam leg on the second grab rod, the first sleeve bearing and the second sleeve bearing oriented parallel relative to each other; the first sleeve bearing and the second sleeve bearing operate together to grasp the rooting stock, and the grab rod pair rotatable to grasp the rooting stock, with the first grab rod rotates in the first sleeve bearing and the second grab rod rotates within the second sleeve bearing; the grab rod pair rotates from an open grab position to a closed grab position, and the grab rod pair rotates back and forth from the open grab position to the closed grab position, repeatedly in a rotational movement; the rotational movement of the grabber mechanism accomplished by the action of the cam leg located proximate to the base end of each grab rod; the first grab rod having a first grab tine and the second grab rod having a second grab tine, the cam leg extends from the grab rod, and the cam leg terminates with a cam; a top cam opener engages the cam, to rotate the grab rod pair from the closed grab position to the open grab position, and the top cam opener mounted to the planter frame proximate to the pick-up station; each cam leg of the grab rod pair disengages from the top cam opener and return to the closed grab position after the grabber mechanism travels past the top cam opener by movement of the chain loop; and each grabber mechanism mounted on the chain loop receives the rooting stock in turn at the pick-up station, and the chain loop proceeds in the forward chain movement direction around the forward sprocket, and rotates the grabber mechanism to a planting release station.

2. The planter apparatus of claim 1, additionally wherein: the grab rod pair of the pair of grabbers rotate from the closed grab position holding the rooting stock, to the open grab position releasing the rooting stock at the planting release station, the rotational movement of the grab rod pair accomplished by the action of the cam on the cam leg proximate to the base end of each grab rod; and the grab rod pair rotates from the closed grab position to the open grab position by a bottom cam opener, the bottom cam opener located proximate to the planting release station to engage the cam, and the bottom cam opener mounted to the planter frame.

3. The planter apparatus of claim 2, additionally wherein: the bottom cam opener is a steel plate; and
the bottom can opener is adjustable forward or rearward relative to the chain loop, the bottom cam opener located proximate to the planting release station, to release the rooting stock from the grab rod pair as the grabber mechanism moves about the chain loop.

4. The planter apparatus of claim 3, additionally wherein: after the grabber mechanism travels on the chain loop past the bottom cam opener, the cam legs of the grab rod pair disengage from the bottom cam opener and are forced to return to the closed grab position by a grab rod torsion spring that is mounted on each grab rod, and push and maintain the grab rod pair to the closed grab position with the grab tines nested together.

5. The planter apparatus of claim 1, additionally wherein: a planting depth of the rootstock below the soil surface is maintained by the planter frame riding at a preset and adjustable height relative to the soil surface of tail end wheels located proximate the rearward frame end.

6. The planter apparatus of claim 1, additionally wherein: the planter frame pivots at a forward attachment point near a ripper shank;
the ripper shank having a plow blade located at a forward ripper shank end opposite a throat that receives the grabber mechanism with the rooting stock as the grabber mechanism moves on the chain loop.

7. The planter apparatus of claim 1, additionally wherein: a pair of tiller discs cover the rooting stock after the rooting stock is release from the grabber mechanism at the planting release station, the pair of tiller discs mounted on the planter frame, and located proximate to the rearward frame end and behind the grabber mechanism at the planting release station.

8. The planter apparatus of claim 7, additionally wherein: the pair of tiller discs are height adjustable, to move a soil material over the root end of the rooting stock prior to the grabber mechanism actuated by the action of the cam legs on a bottom cam opener to the open grab position, and the multiple of tines release the rooting stock.

9. The planter apparatus of claim 1, further comprising: a top sprocket engaging the chain loop, the top sprocket functioning as an idler, to reduce slack or increase tension in the chain loop.

10. The planter apparatus of claim 1, further comprising: a top sprocket engaging the chain loop, the top sprocket functioning as a drive to rotate the chain loop.

11. The planter apparatus of claim 1, additionally wherein:
the forward sprocket is located proximate to the forward frame end of the planter frame and the rearward sprocket is located proximate to the rearward frame end of the planter frame;
the planter frame moves in a forward travel direction with a drive line linked to the rear drive sprocket; and
a frame wheel pair located proximate to the rearward frame end.

12. The planter apparatus of claim 1, wherein:
the planter apparatus includes at least three grabber mechanisms, with each grabber mechanism mounted to the chain loop with a grabber connection.

13. The planter apparatus of claim 1, wherein:
the first grab tine and the second grab tine are each a multiple of tines, with each tine formed of a tine rod; and
each tine bar is bent at approximately a right angle and attached proximate to the grabber end of each grab rod.

14. The planter apparatus of claim 1, wherein:
the top cam opener is a plate, the plate adjustable forward or rearward relative to the chain loop, to the pick up station for receiving the rooting stock into the grab rod pair as the grabber mechanism moves about the chain loop.

15. An automated planter apparatus, the planter apparatus comprising: a grabber mechanism mounted on a chain loop, the chain loop continuous and wrapped around a rear sprocket and a forward sprocket; the rear sprocket and the forward sprocket mounted on a planter frame, the planter frame having a forward frame end and a rearward frame end; the grabber mechanism including a pair of grabbers, the pair of grabbers having a first grabber coupled with a second grabber, and the grabber mechanism attached to the chain loop; a rooting stock received by the grabber mechanism at a pick-up station, the rooting stock having a root end and a sprout length, and the rooting stock placed into the grabber mechanism with the root end above the sprout end, relative to a soil surface beneath the planter frame; the first grabber having a first grab rod and the second grabber having a second grab rod, the first grab rod and the second grab rod comprising a grab rod pair; the first grab rod and the second grab rod of the grab rod pair each terminate at a grabber end, the grabber end located proximate to a grab tine, and each grab rod terminates at a base end, the grabber end located opposite to the base end, and the base end located proximate to a cam leg; the first grab rod received into a first sleeve bearing, and the second grab rod received into a second sleeve bearing, the first sleeve bearing located approximately between the grab tine and the cam leg, the first sleeve bearing located approximately between the grab tine and the cam leg on the first grab rod and the second sleeve bearing located approximately between the grab tine and the cam leg on the second grab rod, the first sleeve bearing and the second sleeve bearing oriented parallel relative to each other; the first sleeve bearing and the second sleeve bearing operate together to grasp the rooting stock, and the grab rod pair rotatable to grasp the rooting stock, with the first grab rod rotates in the first sleeve bearing and the second grab rod rotates within the second sleeve bearing; the grab rod pair rotates from an open grab position to a closed grab position, and the grab rod pair rotates back and forth from the open grab position to the closed grab position, repeatedly in a rotational movement; the rotational movement of the grabber mechanism accomplished by the action of the cam leg located proximate to the base end of each grab rod; the first grab rod having a first grab tine and the second grab rod having a second grab tine, the cam leg extends from the grab rod, and the cam leg terminates with a cam; the grab rod pair rotates from the closed grab position to the open grab position by a top cam opener engaging the cam, and the top cam opener mounted to the planter frame proximate to the pick-up station; each cam leg of the grab rod pair disengages from the top cam opener and return to the closed grab position after the grabber mechanism travels past the top cam opener, by movement of the chain loop; each grabber mechanism receives the rooting stock in turn at the pick-up station, and the chain loop proceeds in the forward chain movement direction around the forward sprocket, and rotates the grabber mechanism to a planting release station; the grab rod pair of the pair of grabbers rotate from the closed grab position holding the rooting stock, to the open grab position releasing the rooting stock at the planting release station, the rotational movement of the grab rod pair accomplished by the action of the cam on the cam leg proximate to the base end of each grab rod; and the grab rod pair rotates from the closed grab position to the open grab position by a bottom cam opener, the bottom cam opener located proximate to the planting release station to engage the cam, and the bottom cam opener mounted to the planter frame.

16. The planter apparatus of claim 15, additionally wherein:
the bottom cam opener is adjustable forward or rearward relative to the chain loop, the bottom cam opener located proximate to the planting release station, to release the rooting stock from the grab rod pair as the grabber mechanism moves about the chain loop; and
after the grabber mechanism travels on the chain loop past the bottom cam opener, the cam legs of the grab rod pair disengage from the bottom cam opener and are forced to return to the closed grab position by a grab rod torsion spring that is mounted on each grab rod, and push and maintain the grab rod pair to the closed grab position with the grab tines nested together.

17. The planter apparatus of claim 15, additionally wherein:
the planter frame pivots at a forward attachment point near a ripper shank;
the ripper shank having a plow blade located at a forward ripper shank end opposite a throat that receives the grabber mechanism with the rooting stock as the grabber mechanism moves on the chain loop.

18. The planter apparatus of claim 15, further comprising:
a top sprocket engaging the chain loop, the top sprocket functioning as a drive to rotate the chain loop;
the forward sprocket is located proximate to the forward frame end of the planter frame and the rearward sprocket is located proximate to the rearward frame end of the planter frame;
the planter frame moves in a forward travel direction with a drive line linked to the rear drive sprocket; and
a frame wheel pair located proximate to the rearward frame end.

19. The planter apparatus of claim 15, wherein:
the planter apparatus includes at least three grabber mechanisms, with each grabber mechanism mounted to the chain loop with a grabber connection.

20. The planter apparatus of claim 15, wherein:
the first grab tine and the second grab tine are each a multiple of tines, with each tine formed of a tine rod; and
each tine bar is bent at approximately a right angle and attached proximate to the grabber end of each grab rod.

* * * * *